(12) United States Patent
Mueller et al.

(10) Patent No.: US 12,250,655 B2
(45) Date of Patent: Mar. 11, 2025

(54) CLIENT INITIATED LOW-LATENCY NETWORK EDGE SPECTRUM-AS-A-SERVICE CONTROLLER

(71) Applicant: Dell Products, L.P., Round Rock, TX (US)

(72) Inventors: Julius Mueller, Santa Cruz, CA (US); Ihab Tarazi, Burlingame, CA (US)

(73) Assignee: Dell Products, L.P., Round Rock, TX (US)

( * ) Notice: Subject to any disclaimer, the term of this patent is extended or adjusted under 35 U.S.C. 154(b) by 364 days.

(21) Appl. No.: 17/646,782

(22) Filed: Jan. 3, 2022

(65) Prior Publication Data

US 2023/0217399 A1    Jul. 6, 2023

(51) Int. Cl.
| | | |
|---|---|---|
| *H04W 60/00* | (2009.01) | |
| *H04W 16/14* | (2009.01) | |
| *H04W 76/10* | (2018.01) | |
| *H04W 76/30* | (2018.01) | |

(52) U.S. Cl.
CPC .......... *H04W 60/00* (2013.01); *H04W 16/14* (2013.01); *H04W 76/10* (2018.02); *H04W 76/30* (2018.02)

(58) Field of Classification Search
CPC ..... H04W 60/00; H04W 16/14; H04W 76/10; H04W 76/30; H04W 92/18; H04W 76/14
See application file for complete search history.

(56) References Cited

U.S. PATENT DOCUMENTS

| | | | |
|---|---|---|---|
| 8,199,768 B1* | 6/2012 | Gossett | G06Q 40/04 |
| | | | 705/37 |
| 10,039,105 B1 | 7/2018 | Baeder | |
| 10,271,351 B1 | 4/2019 | Wang | |
| 10,575,185 B2* | 2/2020 | Li | H04W 16/14 |

(Continued)

FOREIGN PATENT DOCUMENTS

WO    WO-2014160228 A1 *   10/2014   ............ H04W 16/14

OTHER PUBLICATIONS

Xin Chunsheng et al. "On Dynamic Spectrum Allocation in Geo-Location Spectrum Sharing Systems", IEEE Transactions on Mobile Computing, vol. 18, No. 4, Apr. 1, 2019 (Apr. 1, 2019), pp. 923-933, XP011713586, ISSN: 1536-1233. (Year: 2019).*

(Continued)

*Primary Examiner* — Yuwen Pan
*Assistant Examiner* — Swati Jain
(74) *Attorney, Agent, or Firm* — Amin, Turocy & Watson, LLP

(57) ABSTRACT

A client-initiated low-latency network edge spectrum-as-a-service controller is described herein. A method as described herein can include transmitting, by a system comprising a processor to a first spectrum access system, a request for first access rights to a first spectrum band, wherein the first spectrum band is wholly contained within a second spectrum band for which the first spectrum access system is granted second access rights from a second spectrum access system, distinct from the first spectrum access system; obtaining, by the system, the first access rights to the first spectrum band from the first spectrum access system in response to the request; and, in response to obtaining the first access rights, initiating, by the system via the first spectrum band, a point-to-point communication link between the system and a user equipment.

20 Claims, 13 Drawing Sheets

(56) References Cited

U.S. PATENT DOCUMENTS

| | | |
|---|---|---|
| 11,153,762 B1 | 10/2021 | Routt |
| 11,356,499 B1 | 6/2022 | Singh et al. |
| 11,528,615 B2* | 12/2022 | Mueck .................. H04W 16/14 |
| 11,528,725 B1 | 12/2022 | Qureshi et al. |
| 11,778,480 B2 | 10/2023 | Kakinada et al. |
| 11,871,284 B1 | 1/2024 | Edara et al. |
| 2014/0220999 A1 | 8/2014 | Cordeiro et al. |
| 2016/0150415 A1 | 5/2016 | Laneman et al. |
| 2016/0183259 A1 | 6/2016 | Mueck et al. |
| 2017/0208476 A1 | 7/2017 | Khambekar et al. |
| 2017/0374557 A1 | 12/2017 | Mueck et al. |
| 2018/0115903 A1 | 4/2018 | Badic et al. |
| 2018/0132111 A1* | 5/2018 | Mueck ................ H04B 1/7136 |
| 2018/0146380 A1 | 5/2018 | Srikanteswara et al. |
| 2018/0242165 A1 | 8/2018 | MacMullan et al. |
| 2018/0288621 A1 | 10/2018 | Markwart et al. |
| 2018/0317093 A1* | 11/2018 | Li .......................... H04W 16/14 |
| 2018/0332660 A1 | 11/2018 | Mueck et al. |
| 2019/0104489 A1 | 4/2019 | Huang et al. |
| 2019/0124665 A1 | 4/2019 | Singh |
| 2019/0132776 A1 | 5/2019 | Markwart et al. |
| 2019/0132853 A1* | 5/2019 | Mitola, III ............ H04W 16/14 |
| 2019/0327765 A1* | 10/2019 | Mukherjee ............ H04W 16/14 |
| 2019/0335337 A1 | 10/2019 | Damnjanovic et al. |
| 2019/0364435 A1 | 11/2019 | Ahmavaara |
| 2019/0364565 A1 | 11/2019 | Hmimy et al. |
| 2020/0029222 A1 | 1/2020 | Mueck et al. |
| 2020/0112950 A1 | 4/2020 | Chen et al. |
| 2020/0267563 A1* | 8/2020 | Sevindik ............... H04W 16/14 |
| 2020/0305004 A1 | 9/2020 | Ansley et al. |
| 2020/0382963 A1 | 12/2020 | Mueck et al. |
| 2021/0014693 A1* | 1/2021 | Syed ...................... H04W 16/28 |
| 2021/0022007 A1 | 1/2021 | McFadden et al. |
| 2021/0076346 A1* | 3/2021 | Daoud .................. H04W 72/56 |
| 2021/0099886 A1 | 4/2021 | Taneja et al. |
| 2021/0136666 A1 | 5/2021 | Srivastava et al. |
| 2021/0153029 A1* | 5/2021 | Mueck .................. H04W 16/14 |
| 2021/0211880 A1 | 7/2021 | Khawer et al. |
| 2021/0211887 A1 | 7/2021 | Jones |
| 2021/0211889 A1* | 7/2021 | Buddhikot ............ H04W 16/16 |
| 2021/0219143 A1 | 7/2021 | Khalid et al. |
| 2021/0227628 A1 | 7/2021 | Sevindik et al. |
| 2021/0243612 A1 | 8/2021 | Kempf et al. |
| 2021/0368349 A1 | 11/2021 | Bandyopadhyay et al. |
| 2021/0385664 A1 | 12/2021 | Nguyen et al. |
| 2022/0007451 A1 | 1/2022 | Wang et al. |
| 2022/0046641 A1 | 2/2022 | Sayenko et al. |
| 2022/0060904 A1 | 2/2022 | Das et al. |
| 2022/0132321 A1 | 4/2022 | Sun et al. |
| 2022/0183093 A1 | 6/2022 | Sevindik et al. |
| 2022/0191675 A1 | 6/2022 | Mukherjee et al. |
| 2022/0264287 A1 | 8/2022 | Vaidya et al. |
| 2022/0303782 A1 | 9/2022 | Litjens et al. |
| 2022/0346030 A1 | 10/2022 | Al-Mufti et al. |
| 2022/0361089 A1 | 11/2022 | Loffe et al. |
| 2022/0361184 A1 | 11/2022 | Beck et al. |
| 2022/0386132 A1 | 12/2022 | Sevindik |
| 2022/0394491 A1 | 12/2022 | Khawer et al. |
| 2022/0417761 A1* | 12/2022 | Khawer ................ H04W 16/14 |
| 2022/0417763 A1* | 12/2022 | Ioffe ...................... H04W 60/00 |
| 2023/0007668 A1 | 1/2023 | Al-Mufti et al. |
| 2023/0021659 A1 | 1/2023 | Hafeez et al. |
| 2023/0035635 A1 | 2/2023 | Levine |
| 2023/0038751 A1 | 2/2023 | Mueller |
| 2023/0040246 A1 | 2/2023 | Mueller |
| 2023/0043541 A1 | 2/2023 | Mueller |
| 2023/0044576 A1 | 2/2023 | Mueller |
| 2023/0045596 A1 | 2/2023 | Mueller |
| 2023/0098387 A1 | 3/2023 | Hafeez et al. |
| 2023/0180246 A1 | 6/2023 | Singh et al. |
| 2023/0199851 A1* | 6/2023 | Mukherjee ........ H04W 74/0808 370/329 |
| 2023/0284033 A1 | 9/2023 | Bandyopadhyay et al. |
| 2023/0362970 A1 | 11/2023 | Furuichi |
| 2024/0015520 A1* | 1/2024 | Khawer ................ H04W 16/14 |
| 2024/0022914 A1* | 1/2024 | Kakinada .......... H04W 72/0453 |
| 2024/0215002 A1* | 6/2024 | Sevindik ............... H04W 16/14 |

OTHER PUBLICATIONS

Xin Chunsheng et al. "On Dynamic Spectrum Allocation in Geo-Location Spectrum Sharing Systems", IEEE Transactions on Mobile Computing, vol. 18, No. 4, Apr. 1, 2019 (Apr. 1, 2019), pp. 923-933, XP011713586, ISSN: 1536-1233. (Year: 2019) (Year: 2019).*

Winnf: "Signaling Protocols and Procedures for Citizens Broadband Radio Service (CBRS): Spectrum Access System (SAS)—Citizens Broadband Radio Service Device (CBSD) Interface Technical Specification Spectrum Sharing Committee Work Group 3 SAS-CBSD TS WINNF-TS-0016-V1.2.5", May 18, 2020, pp. 1-52. (Year: 2020).*

International Search Report and Written Opinion received for PCT Application Serial No. PCT/US2022/053044 dated Mar. 28, 2023, 14 pages.

Xin et al., "On Dynamic Spectrum Allocation in Geo-Location Spectrum Sharing Systems", IEEE Transactions on Mobile Computing, vol. 18, No. 4, Apr. 2019, 11 pages.

International Search Report and Written Opinion received for PCT Application Serial No. PCT/US2022/053045 dated May 2, 2023, 16 pages.

Winnforum Standards, "Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, May 18, 2020, 60 pages.

Palola et al., "Field Trial of the 3.5 Ghz Citizens Broadband Radio Service Governed by a Spectrum Access System (SAS)", IEEE, International Symposium on Dynamic Spectrum Access Networks, 2017, 9 pages.

Shi et al., "Challenges and New Directions in Securing Spectrum Access Systems", IEEE, Internet of Things Journal, vol. 08, No. 8, Apr. 15, 2021, 21 pages.

Non-Final Office Action received for U.S. Appl. No. 17/644,671, dated Feb. 16, 2024, 27 pages.

Final Office Action received for U.S. Appl. No. 17/644,671, dated May 23, 2024, 21 pages.

International Preliminary Report on Patentability for PCT Application No. PCT/US2022/053045 mailed Jul. 18, 2024, 8 pages.

European Office Action mailed Aug. 13, 2024 for European Patent Application No. 22851178.8, 3 pages.

International Preliminary Report on Patentability for PCT Application No. PCT/US2022/053044 mailed Jun. 27, 2024, 8 pages.

European Office Action mailed Jul. 23, 2024 for European Patent Application No. 22850822.2, 3 pages.

Notice of Allowance mailed Dec. 3, 2024 for U.S. Appl. No. 17/644,671, 29 pages.

* cited by examiner

CLIENT INITIATED LOW-LATENCY NETWORK EDGE SPECTRUM-AS-A-SERVICE CONTROLLER

BACKGROUND

Citizens Broadband Radio Service (CBRS) is a wireless spectrum band of the 3.5 GHz band, presently a 150 MHz band running from 3550 MHz to 3700 MHz, that has been designated by the United States government for private telecommunication use. Entities such as corporations, universities, governmental agencies, or other enterprises can obtain prioritized access to sections of the CBRS band within a given geographic area by requesting a Priority Access License (PAL) from a Spectrum Access System (SAS). In general, a PAL grants the licensee prioritized access to one or more 10 MHz sections of the CBRS band within a given geographic area for a fixed period of time, e.g., three years. In this way, CBRS can enable enterprises to build out private communication networks without the expense associated with licensed spectrum or the potential for congestion associated with unlicensed spectrum.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include a spectrum request component that transmits an access request for a first spectrum band to a first spectrum access system, where the first spectrum band is wholly contained within a second spectrum band, and where the first spectrum access system is granted an access license for the second spectrum band from a second spectrum access system that is distinct from the first spectrum access system. The executable components can further include a grant processing component that receives a grant of access rights to the first spectrum band from the first spectrum access system in response to the access request. The executable components can additionally include a link establishment component that, in response to receiving the grant of the access rights to the first spectrum band, establishes, via the first spectrum band, a device-to-device communication link between the system and a user equipment.

In another implementation, a method is described herein. The method can include transmitting, by a system including a processor to a first spectrum access system, a request for first access rights to a first spectrum band, where the first spectrum band is wholly contained within a second spectrum band for which the first spectrum access system is granted second access rights from a second spectrum access system, distinct from the first spectrum access system. The method can also include obtaining, by the system, the first access rights to the first spectrum band from the first spectrum access system in response to the request. The method can further include, in response to obtaining the first access rights, initiating, by the system via the first spectrum band, a point-to-point communication link between the system and a user equipment.

In an additional implementation, a non-transitory machine-readable medium including computer executable instructions is described herein. The instructions, when executed by a processor of a data storage system, can facilitate performance of operations including transmitting, to a first spectrum access system, an allocation request for a first spectrum band, where the first spectrum band is wholly contained within a second spectrum band, and where the first spectrum access system is granted access rights to the second spectrum band by a second spectrum access system that is distinct from the first spectrum access system; receiving, from the first spectrum access system, an allocation of the first spectrum band in response to the allocation request; and, in response to receiving the allocation of the first spectrum band, establishing a direct communication link to a user equipment via the first spectrum band.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
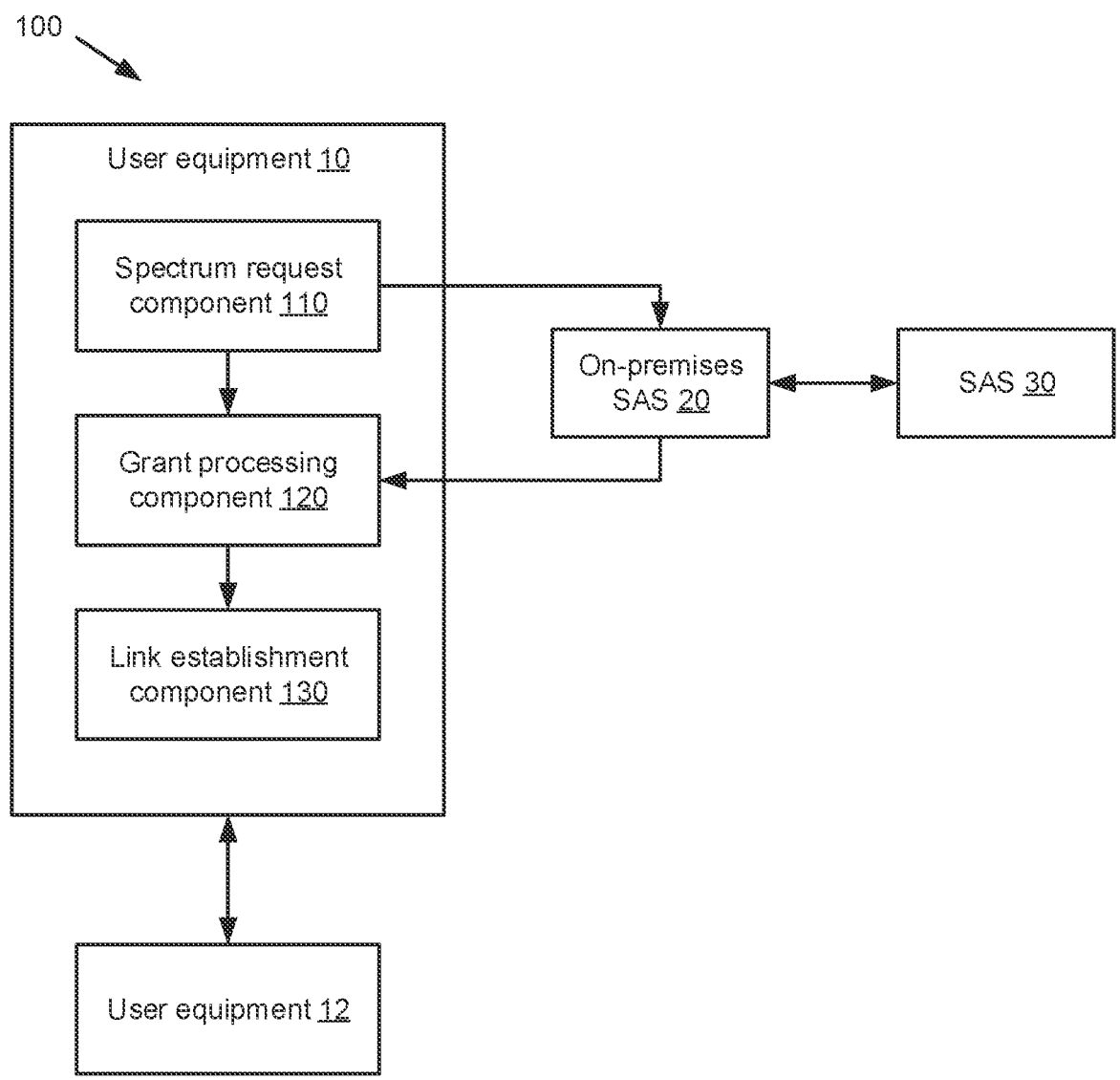
FIG. 1 is a block diagram of a system that facilitates a client-initiated low-latency network edge spectrum-as-a-service controller in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein facilitate the implementation of a client-initiated low-latency spectrum-as-a-service controller, e.g., a CBRS SAS, at the edge of a communication network enabled via the controller. By way of example, a private device-to-device communication link utilizing resources in the CBRS band can be initiated at a given physical premises by a user equipment (UE) and/or other suitable network equipment by requesting CBRS band resources from a hierarchical and distributed SAS operating on or near the physical premises, referred to herein as an "on-premises SAS." An on-premises SAS as described herein can operate in combination with a centralized SAS to facilitate access to spectrum resources, e.g., portions of the CBRS band, with reduced latency. While various example implementations provided herein relate to specific radio access technologies, interfaces, etc., it is noted that other radio access technologies, interfaces, etc., could also be used. Unless explicitly stated otherwise, the following description and claimed subject matter are not intended to be limited to any specific radio access technology, interfaces, or other aspects.

Due to the limited availability of wireless spectrum, it is generally desirable to regulate access to spectrum bands. For instance, CBRS provides for three distinct access tiers with varying levels of access rights, which are as follows:

1) Incumbent Access—Incumbent Access is the highest access tier in CBRS and includes various military and/or other governmental users along with other specifically designated entities. Users in the Incumbent Access tier are permitted access to designated portions of the CBRS band at any time. Users in other access tiers are prohibited from operating in the CBRS band in a manner that would cause harmful interference to a CBRS user.

2) Priority Access—Access to the Priority Access tier is regulated via Priority Access Licenses (PALs) obtained through a SAS, e.g., by way of a competitive bidding process. A PAL grants prioritized access to a given portion of the CBRS band (e.g., a 10 MHz sub-band) within a defined geographic area for a defined length of time (e.g., 3 years). More particularly, a PAL grants a Priority Access user full access rights to the associated CBRS spectrum subject to the terms of the PAL and any restrictions placed on the spectrum by Incumbent Access users.

3) General Authorized Access—The General Authorized Access tier is designed to enable a wide range of potential users access to any CBRS resources that are not assigned to and/or being utilized by users in the other access tiers. Typically, General Authorized Access users are required to vacate any utilized resources if their use of the resources conflicts with, or causes interference to, an Incumbent Access or Priority Access user.

Due to the precision in time, location, and signal strength associated with CBRS spectrum grants, CBRS spectrum can be controlled via centralized, cloud-based SAS deployments. However, while cloud deployments ensure global and high-availability services, they can also result in higher latencies between spectrum requests, e.g., between a radio access network (RAN) and a SAS. For instance, registration of a CBRS-enabled device, also referred to as a Citizens Broadband Radio Service Device or CBSD, and a corresponding spectrum request involves the transmission of three bidirectional message exchanges, including six messages in total, until requested spectrum can be utilized through a CBSD.

In terms of theoretical computer science, applying the CAP (Consistency, Availability, Partitioning tolerance) theorem to the centralized SAS/CBRS architecture demonstrates that this architecture focuses on consistency and availability without introducing partitioning tolerance. While partitioning tolerance is missing in a centralized CBRS architecture, it is nonetheless desirable as it enables low latency services such as Ultra-Reliable Low Latency Communications (URLLC) on demand and/or as a service, device-to-device (d2d) direct communication, uplink-dominated time sensitive networks, and so on.

In view of the above, various implementations herein provide for client-initiated spectrum requests to an on-premises distributed and hierarchical SAS, which can enable partitioning tolerance next to availability and consistency. This, in turn, can enable significantly faster spectrum grants as compared to a centralized SAS. For instance, decentralizing the SAS can enable Fifth Generation (5G) URLLC services with on-demand spectrum grants, resulting in an increase in the number of devices with access to an always-on control channel and/or on-demand high-throughput ultra-low-latency channels. Other advantages of the implementations shown and described herein are also possible.

Additionally, as CBRS spectrum can be divided and partitioned on the basis of geography, an on-premises SAS as described herein can operate within an underlying hierarchical system that can be globally distributed and managed independently. To handle cases involving on-premises SASs sharing an adjacent border, further coordination between the adjacent on-premises SASs can be performed.

With reference now to the drawings, FIG. 1 illustrates a block diagram of a system 100 that facilitates a client-initiated low-latency network edge spectrum-as-a-service controller in accordance with various implementations described herein. As shown in FIG. 1, system 100 includes a user equipment device 10, also referred to as simply a user equipment or UE, that includes a spectrum request component 110, a grant processing component 120, and a link establishment component 130, which can operate as described in further detail below. In an implementation, the components 110, 120, 130 of the user equipment 10 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 13.

With respect now to the components 110, 120, 130 of the user equipment 10 shown in FIG. 1, the spectrum request component 110 can transmit, to an on-premises SAS 20, an access request for a first spectrum band. In an implementation, the first spectrum band associated with the access request transmitted by the spectrum request component 110 can be wholly contained within and/or otherwise associated with a second, larger spectrum band that is managed by the on-premises SAS 20. For instance, the on-premises SAS 20 can obtain an access license for the second spectrum band from a centralized SAS 30 via a spectrum request procedure. This access license can be, or otherwise include, a PAL that grants access rights to the second spectrum band (e.g., as defined by one or more 10 MHz sections of the CBRS band, etc.) for a given location, transmit power, and/or length of time. As used herein, an initial allocation of resources obtained by the on-premises SAS 20 from the SAS 30 is referred to as a master grant. The master grant is described in further detail below with respect to FIG. 2.

The grant processing component 120 of the UE 10 can receive and/or process a grant of access rights to the first spectrum band, e.g., as requested by the spectrum request component 110 as described above, provided by the on-premises SAS 20 in response to the request provided to the on-premises SAS 20 by the spectrum request component 110. In an implementation, the on-premises SAS 20 can grant access rights to the first spectrum band to the UE 10 in response to determining that the first spectrum band is available for access by the UE 10 based on its location, desired transmit power, and/or other factors. As used herein, an allocation of spectrum resources within a master grant to the UE 10 is referred to as a secondary grant. Example operations that can be performed by the on-premises SAS 20 in determining the availability of spectrum for a given secondary grant are described in further detail below with respect to FIG. 5.

In response to the grant processing component 120 receiving a grant of access rights for the first spectrum band as requested by the spectrum request component 110, the link establishment component 130 of the UE 10 can establish, via the first spectrum band, a direct (point-to-point) communication link to another UE 12, thereby facilitating device-to-device communication between the UEs 10, 12 via the direct communication link.

By establishing a direct link between UEs 10 and 12 via the link establishment component 130 as described above, the UEs 10 and 12 can engage in voice calls and/or other communications via spectrum allocated to the UE 10 by the on-premises SAS 20 without the intervention of a RAN and/or its associated equipment. As a result, the round trip time (RTT) associated with communications between UEs 10 and 12 can be reduced, e.g., due to said communications not traversing any elements of a RAN. A device-to-device communication link as established herein can include lower latency, higher throughput, and/or increased connection reliability in comparison to a communication link that traverses network elements between the devices, and/or other beneficial aspects.

In various implementations, the UEs 10, 12 can be, and/or include the functionality of, any suitable user-operated or client-operated device that is capable of connection to a communication network. For instance, UE 10 and/or UE 12 can be a mobile phone, a laptop or tablet computer with cellular or other network connectivity, a desktop computer or other computing device including a modem, network adapter, or other device that facilitates a connection by the computing device to a network, and/or any other suitable device(s), either presently existing or developed in the future.

Figure 2:
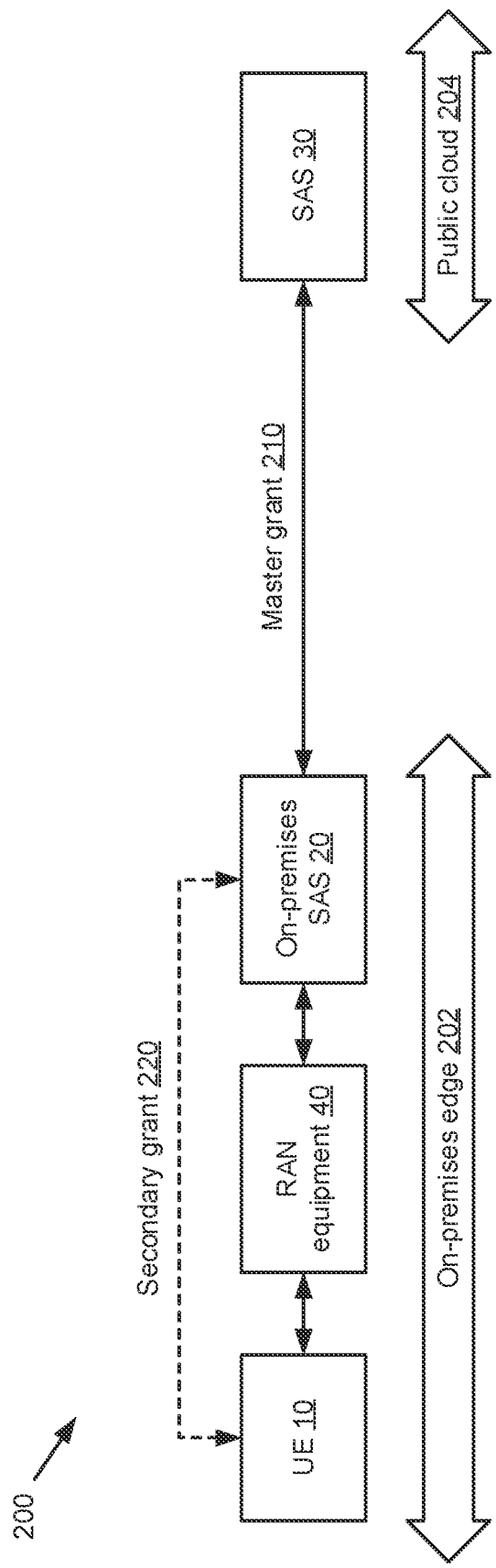
FIG. 2 is a diagram depicting proxy operations that can be performed by a user equipment and an on-premises spectrum access system in accordance with various implementations described herein.

Referring now to FIG. 2, a diagram 200 depicting proxy operations that can be performed by a UE 10 and an on-premises SAS 20 is provided. Repetitive description of like elements that are employed in other embodiments described herein is omitted for brevity. Diagram 200 as shown in FIG. 2 depicts a UE 10, an on-premises SAS 20, and a SAS 30, which can interact with each other as described above with respect to FIG. 1. Diagram 200 further depicts RAN equipment 40, which can provide network connectivity between the UE 10 and the on-premises SAS 20. The RAN equipment 40 can be and/or otherwise include a cellular access point, such as an eNodeB (eNB) or gNodeB (gNB), or alternatively the RAN equipment 40 can include one or more control devices such as a RAN Intelligent Controller (RIC). Other implementations are also possible. It is noted that while RAN equipment 40 is illustrated in diagram 200 as providing network connectivity between the UE 10 and the on-premises SAS 20, the UE 10 and on-premises SAS 20 could also communicate with each other directly, e.g., as denoted by the dashed line in diagram 200.

In some implementations, the on-premises SAS 20 shown in diagram 200 can be implemented by the RAN equipment 40. For instance, in an implementation in which the RAN equipment 40 includes an access point, the on-premises SAS 20 can be implemented via one or more network functions at the access point. The on-premises SAS 20 could be implemented via other RAN equipment 40, such as a RIC and/or other suitable devices. As another alternative, the on-premises SAS 20 can be implemented via a standalone server or other device that provides on-premises SAS functionality to one or more RANs, e.g., one or more RANs located in an area that includes the RAN associated with the RAN equipment 40. As another alternative, network functions used to implement on-premises SAS 20 can be virtualized and/or otherwise instantiated via one or more virtual machines, which in turn can operate from one or more physical computing devices. Other implementations are also possible.

As further shown in diagram 200, the UE 10, the on-premises SAS 20, and the RAN equipment 40 can operate within, and/or otherwise be associated with, an on-premises edge 202. As used herein, the on-premises edge 202 represents one or more edge network functions and/or equipment corresponding to a RAN that is associated with the UE 10 and/or RAN equipment 40.

While the term "on-premises edge" is used herein for simplicity, it is noted that the UE 10, RAN equipment 40, and on-premises SAS 20 need not occupy the same physical premises. For instance, in some implementations the RAN equipment 40 can be associated with a RAN that is situated at a given physical premises, and the on-premises SAS 20 can be physically situated off the physical premises associated with the RAN equipment 40, e.g., at a site adjacent to or otherwise physically near the site of the RAN and/or other RANs (not shown in FIG. 2) to which the on-premises SAS 20 also provides service. Additional details regarding the implementation of the on-premises edge 202 are described in further detail below with respect to FIG. 8. Additionally, components and techniques that can be utilized by the on-premises SAS 20 to manage and/or facilitate coordination between multiple RAN sites are described in further detail below with respect to FIG. 9.

As further shown in diagram 200, the SAS 30 can be implemented as a cloud service associated with a public cloud 204, e.g., a cloud computing platform implemented by a cloud service provider. Alternatively, the SAS 30 can be implemented via one or more standalone servers or other physical computing devices. In either the case of a cloud-based SAS 30 or a SAS 30 implemented via dedicated physical computing devices, the on-premises SAS 20 and/or other elements of the on-premises edge 202 can communicate with the SAS 30 over one or more data networks or internetworks, such as the Internet.

As additionally shown by diagram 200, the on-premises SAS 20 can interact with the SAS 30 to obtain a master grant 210 for spectrum resources from the SAS 30. In an implementation in which these spectrum resources correspond to CBRS spectrum, the on-premises SAS 20 can initiate a CBSD registration exchange with the SAS 30, which involves three messages sent from the on-premises SAS 20 to the SAS 30 and three responsive messages returned from the SAS 30 to the on-premises SAS 20. Examples of specific messages that can be transmitted via this exchange are shown and described in further detail below with respect to FIGS. 11-12. As a result of the CBSD registration exchange, the SAS 30 can either confirm the master grant 210, e.g., by providing the on-premises SAS 20 a PAL corresponding to the granted spectrum, or deny the master grant 210, e.g., in response to no CBSD spectrum resources being available for the requested area, transmission power, or time interval.

At the conclusion of the CBSD registration process between the on-premises SAS 20 and the SAS 30, the entirety of the spectrum corresponding to the master grant 210 is registered to the on-premises SAS 20 at the SAS 30. Thus, from the perspective of the SAS 30, the on-premises SAS 20 is the license holder for the resources associated with the master grant 210. At the on-premises SAS 20, the resources associated with the master grant 210 can be added to a pool or inventory of available spectrum resources, which can subsequently be made available to the UE 10 and/or other requesting entities.

As further shown by diagram 200, the UE 10 can request, either directly or indirectly via the RAN equipment 40, a secondary grant 220 of access rights to some or all of the resources granted to the on-premises SAS 20 by the SAS 30 via the master grant 210. Unlike the CBSD registration process between the on-premises SAS 20 and the SAS 30 as described above, the UE 10 shown in diagram 200 can request spectrum access rights from the on-premises SAS 20 via a single message exchange. For instance, the UE 10 can provide a single registration message to the on-premises SAS 20 indicating desired spectrum resources, and the on-premises SAS 20 can confirm or deny the secondary grant 220 by sending a single registration response message to the UE 10, e.g., without sending any other messages to the UE 10 corresponding to the request. Examples of exchanges that can occur between the UE 10 and the on-premises SAS 20 in this manner are described in further detail below with respect to FIGS. 11-12. By enabling a secondary grant 220 of spectrum resources to be obtained by the UE 10 via a single bidirectional message exchange, the on-premises SAS 20 can facilitate on-demand spectrum access to the UE 10, e.g., with substantially lower latency than that associated with an access request submitted by the UE 10 to the SAS 30 directly.

Figure 3:
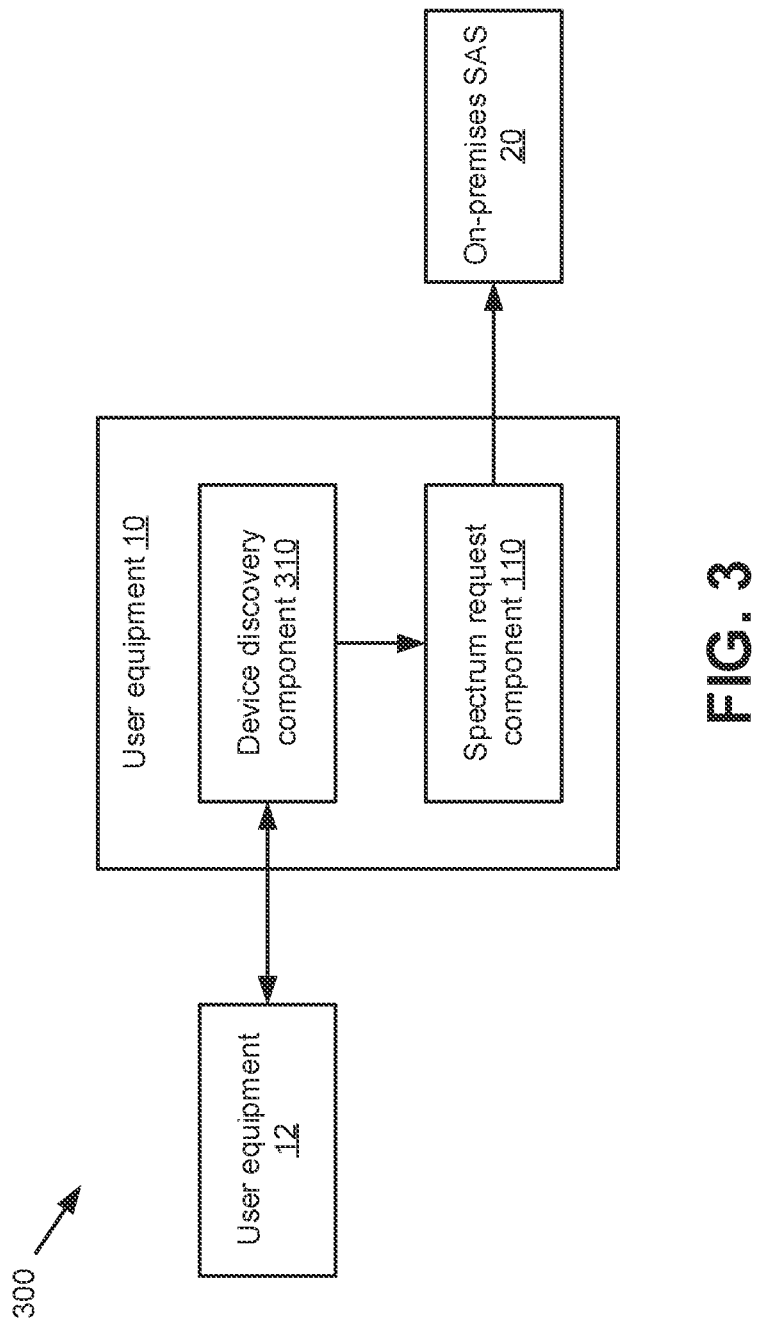
FIG. 3 is a block diagram of a system for device discovery and point-to-point link establishment in accordance with various implementations described herein.

With reference next to FIG. 3, a block diagram of a system 300 for device discovery and point-to-point link establishment is illustrated. Repetitive description of like elements that are employed in other embodiments described herein is omitted for brevity. System 300 as shown in FIG. 3 includes UEs 10, 12 and an on-premises SAS 20, which can operate as described above. As further shown in FIG. 3, the UE 10 of system 300 includes a device discovery component 310 that can establish an initial device-to-device (point-to-point) communication link between the UE 10 and the UE 12.

In various implementations, the device discovery component 310 can facilitate establishing a connection with the UE 12 via any suitable networking technology. By way of non-limiting example, the device discovery component 310 can discover and connect to the UE 12 via Wireless Personal Area Network (WPAN) pairing, Wi-Fi tethering, and/or any other suitable networking technology. Also or alternatively, the device discovery component 310 can establish a communication link via a physical (wired) connection to the UE 12, e.g., via a Universal Serial Bus (USB) connection or the like. As still another example, the UE 12 can include a Radio Frequency Identification (RFID) tag and/or display a barcode, Quick Response (QR) code, and/or other optical information that can be detected by the device discovery component 310.

In response to the device discovery component 310 detecting the UE 12 via one or more suitable techniques, the spectrum request component 110 of the UE 10 can transmit an access request for a given spectrum band to the on-premises SAS 20, e.g., as described above. Once the UE 10 obtains access to the requested spectrum band, a direct connection between the UEs 10, 12 can be established, e.g., by a link establishment component 130 as shown in FIG. 1. This connection can occur at the UE 12 automatically, or alternatively the UE 10 and/or another suitable network entity can provide the UE 12 with information to enable the connection at the UE 12, e.g., via a Short Message System (SMS) message and/or by other means.

In an implementation, the UEs 10, 12 can be associated with a common communication network, e.g., a communication network by which the spectrum request component 110 interacts with the on-premises SAS 20, and the direct communication link between the UEs 10, 12 can be parallel to that link. Alternatively, the device-to-device link between the UEs 10, 12 can be the sole link between said UEs 10, 12, e.g., in the event that the UE 12 is not connected to any networks and/or associated with a different network than that of the UE 10.

The initial link between the UEs 10, 12 as facilitated by the device discovery component 310 can utilize the same technology(-ies) as the subsequent link between the UEs 10, 12 using the spectrum allocated via the on-premises SAS 20 and/or a different technology. By way of example, a first device-to-device communication link between the UEs 10, 12 can be associated with a first radio access technology (RAT), and the second device-to-device communication link between the UEs 10, 12 can be associated with a second, different RAT.

Figure 4:
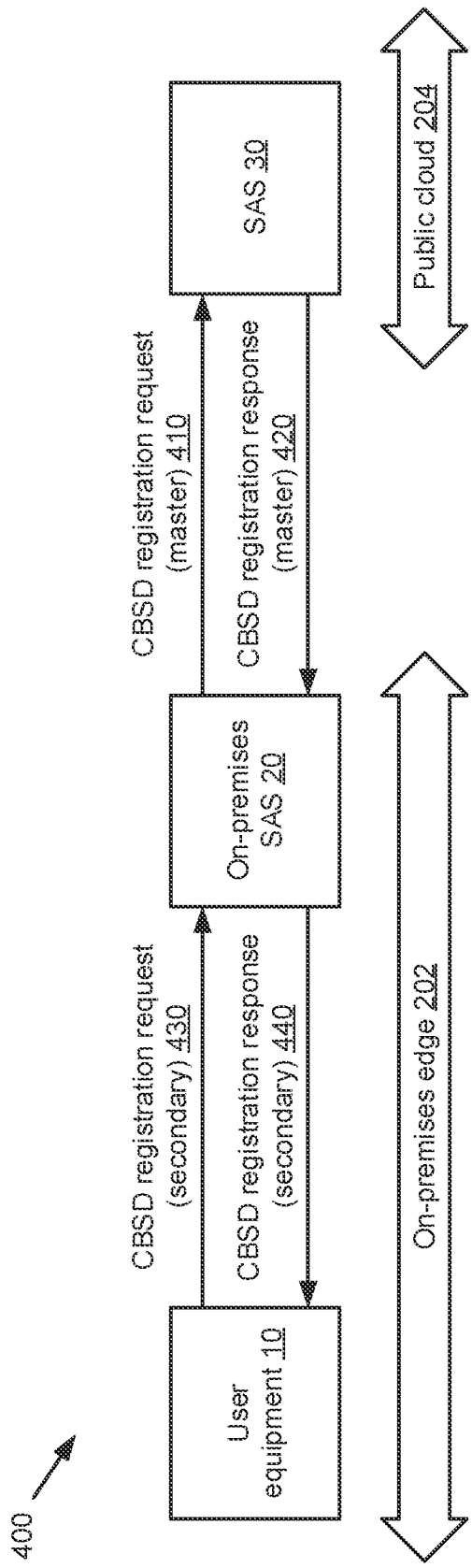
FIG. 4 is a diagram depicting an example technique for managing master and secondary spectrum grants in accordance with various implementations described herein.

Turning now to FIG. 4, a diagram 400 depicting an example technique for managing master and secondary spectrum grants is provided. Repetitive description of like elements that are employed in other embodiments described herein is omitted for brevity. More particularly, the technique shown by diagram 400 can be utilized by the on-premises SAS 20 to request a master grant, out of which multiple smaller secondary grants can be derived. As described above, a secondary grant can be requested by a UE 10 and provided by the on-premises SAS 20 with a single bidirectional message exchange.

As shown at 410, the on-premises SAS 20 can utilize a registration request procedure, e.g., initiated via a CBSD Registration Request message, to request a master grant for a broad and general set of spectrum resources from the SAS 30 associated with the public cloud 204. In an implementation, the resources (e.g., location, duration in time, signal strength, etc.) requested via the master grant can be kept to a larger upper bound. For instance, the on-premises SAS 20 can request one or more 10 MHz portions of the CBRS spectrum in connection with the master grant in order to facilitate multiple smaller secondary grants.

As a result of the registration request procedure initiated by the on-premises SAS 20, the SAS 30 can either issue or deny a PAL for the requested resources, e.g., via an exchange initiated via a CBSD Registration Response message, as shown at 420. Whether the SAS 30 grants or denies the requested master grant could depend on current availability and/or usage of the requested resources and/or other suitable factors.

Subsequent to the SAS 30 issuing the PAL for the master grant, the UE 10 (e.g., via RAN equipment 40) can request spectrum through SAS-specific interfaces from the on-premises SAS 20, instead of the SAS 30. As shown in diagram 400, the UE 10 can request resources from the on-premises SAS 20 via a single CBSD Registration Request message, as shown at 430.

As shown at 440, the on-premises SAS 20 can map the incoming request from the UE 10 against its local master grants and secondary grants. Based on this analysis, the on-premises SAS 20 can either derive a secondary grant or deny the request. If the on-premises SAS 20 derives the secondary grant, it can provide a single message, such as a CBSD Registration Response message, to the UE 10 indicating the secondary grant, as shown at 440.

In an implementation, the on-premises SAS 20 can submit additional master grant requests as shown at 410 to adjust the spectrum grants available to the on-premises SAS 20. Additionally, the secondary grant request procedure shown at 430 and 440 can be repeated for respective attached CBSD devices and/or other network equipment, e.g., in response to changing spectrum utilization and/or other factors.

Figure 5:
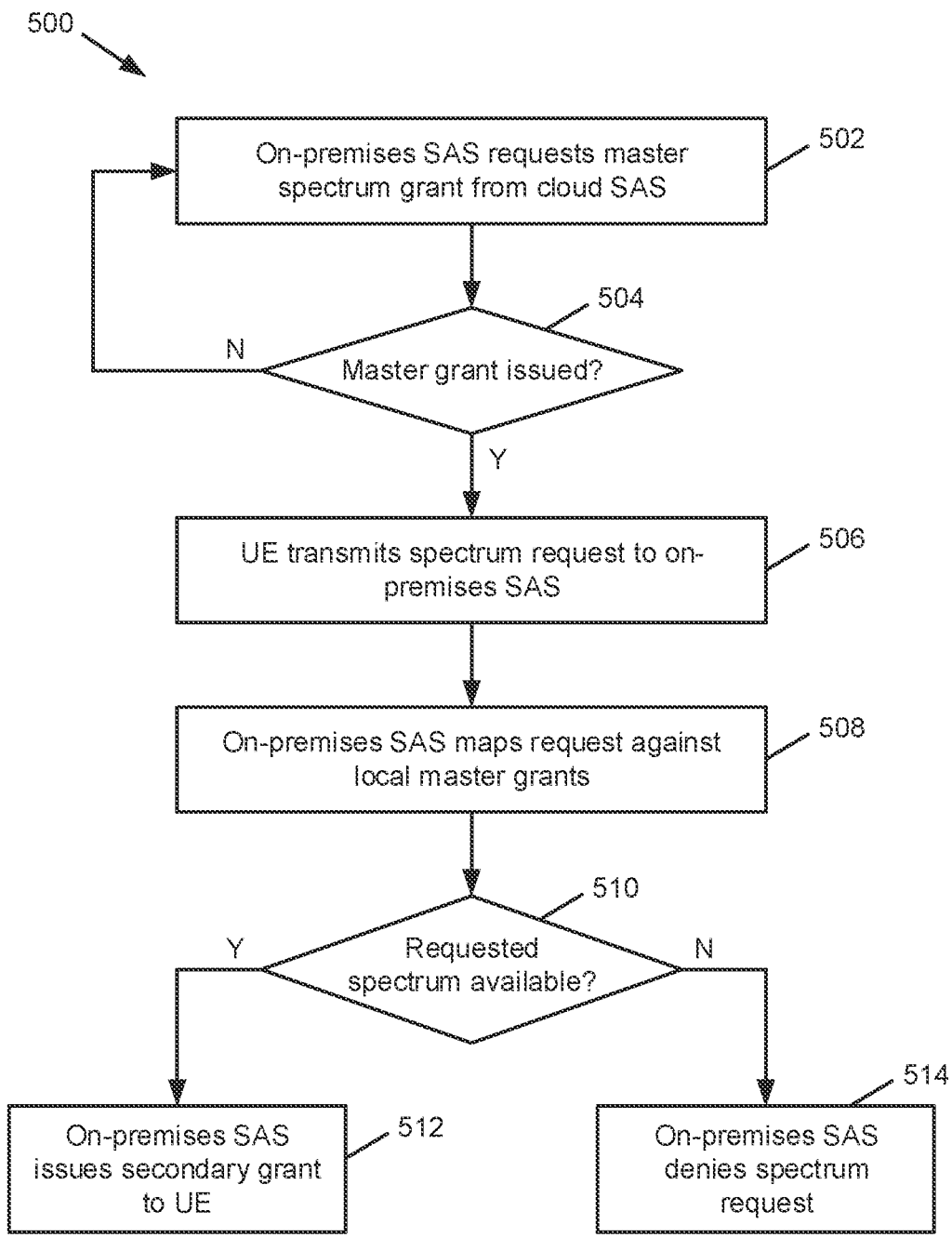
FIG. 5 is of a method that facilitates performance of the operations shown in FIG. 4 in accordance with various implementations described herein.

Referring now to FIG. 5, and with further reference to FIG. 4, a flow diagram of a method 500 that can facilitate the master and secondary grants shown in diagram 400 is illustrated. At 502, the on-premises SAS 20 can request a master spectrum grant from a cloud SAS, e.g., a SAS 30 associated with a public cloud 204, as shown at 410.

At 504, the on-premises SAS 20 can determine whether the requested master grant was issued, e.g., by the SAS 30 as shown at 420. If the grant was not issued, the on-premises SAS 20 can repeat the master grant request at 502. Otherwise, the on-premises SAS 20 can update its inventory to reflect the new master grant.

At 506, the on-premises SAS 20 can receive a spectrum request from a UE 10, e.g., via a registration request message as shown at 430. At 508, the on-premises SAS 20 can map the request received at 506 against its local master grants to facilitate a determination at 510 of whether the spectrum requested at 506 is available. If the requested spectrum is available, method 500 can proceed from 510 to 512, in which the on-premises SAS 20 issues a secondary grant to the UE 10, e.g., via a registration response message as shown at 440. If, alternatively, the requested spectrum is not available, method 500 can instead proceed from 510 to 514, in which the on-premises SAS 20 denies the spectrum request from the UE 10.

Figure 6:
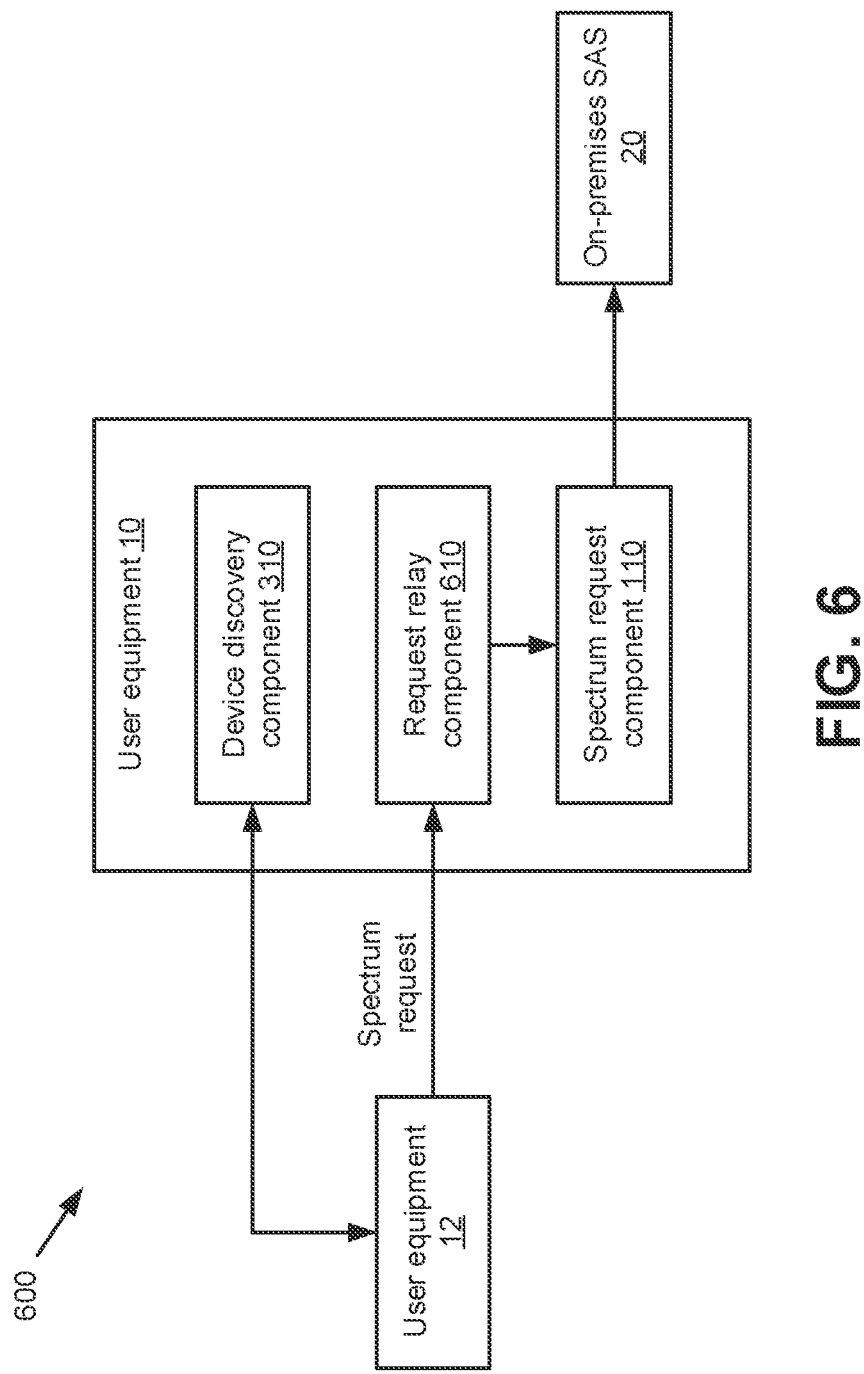
FIG. 6 is a block diagram of a system for relaying spectrum requests to an on-premises spectrum access system in accordance with various implementations described herein.

Turning next to FIG. 6, a block diagram of a system 600 for relaying spectrum requests to an on-premises spectrum access system is illustrated. Repetitive description of like elements that are employed in other embodiments described herein is omitted for brevity. System 600 as shown in FIG. 6 includes a UE 10, which can establish an initial link with another UE 12 via a device discovery component 310, e.g., as described above with respect to FIG. 3. As further shown by FIG. 6, the UE 10 of system 600 further includes a request relay component 610 that can receive an access request for a spectrum band, e.g., as described above, from the UE 12. The request relay component 610 can then facilitate relaying the access request to the on-premises SAS 20, e.g., via the spectrum request component 110, in response to the access request being received by the request relay component 610.

By enabling the relay of spectrum requests from the UE 12 to the on-premises SAS 20 via the request relay component 610, the UE 10 can enable the UE 12 to initiate a device-to-device communication link to the UE 10 even in implementations in which the UE 12 is not located on and/or otherwise associated with a common communication network with the on-premises SAS 20. Specific message flows that can be performed in connection with relaying an access request as shown in system 600 are described in further detail below with respect to FIG. 11.

Figure 7:
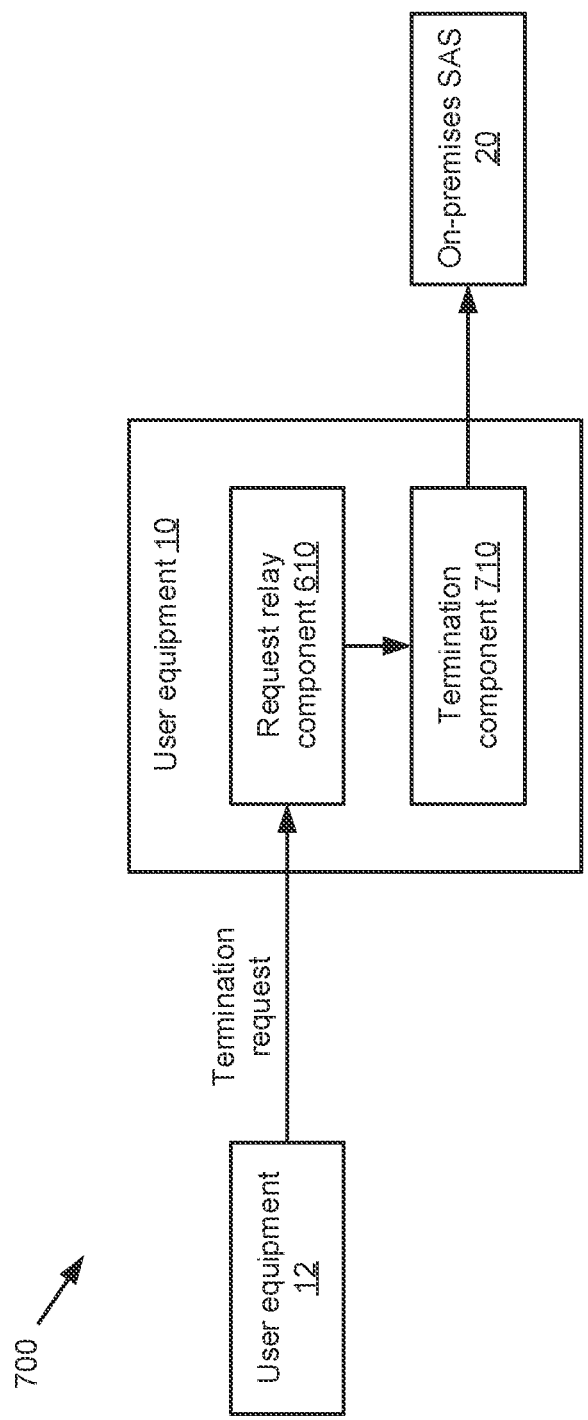
FIG. 7 is a block diagram of a system for point-to-point link termination in accordance with various implementations described herein.

With reference now to FIG. 7, a block diagram of a system 700 for point-to-point link termination is illustrated. Repetitive description of like elements that are employed in other embodiments described herein is omitted for brevity. As shown by FIG. 7, system 700 includes a UE 10 with a termination component 710 that can terminate a device-to-device communication link, e.g., a communication link with the UE 12 via spectrum granted from the on-premises SAS 20 as described above, by transmitting a spectrum release message, and/or other suitable signaling, to the on-premises SAS 20. Upon receiving the spectrum release message and/or other signaling from the UE 10, the on-premises SAS 20 can release the spectrum previously allocated to the UE 10 for the connection between the UEs 10, 12, e.g., such that said spectrum is made available for use by other devices.

As further shown by FIG. 7, termination of a direct link between the UEs 10, 12 can be initiated by either of the UEs 10, 12. In the event that termination is requested by the UE 12, the request relay component 610, and/or other suitable components of the UE 10, can relay the termination request to the on-premises SAS 20, e.g., via a spectrum release message or the like.

Figure 8:
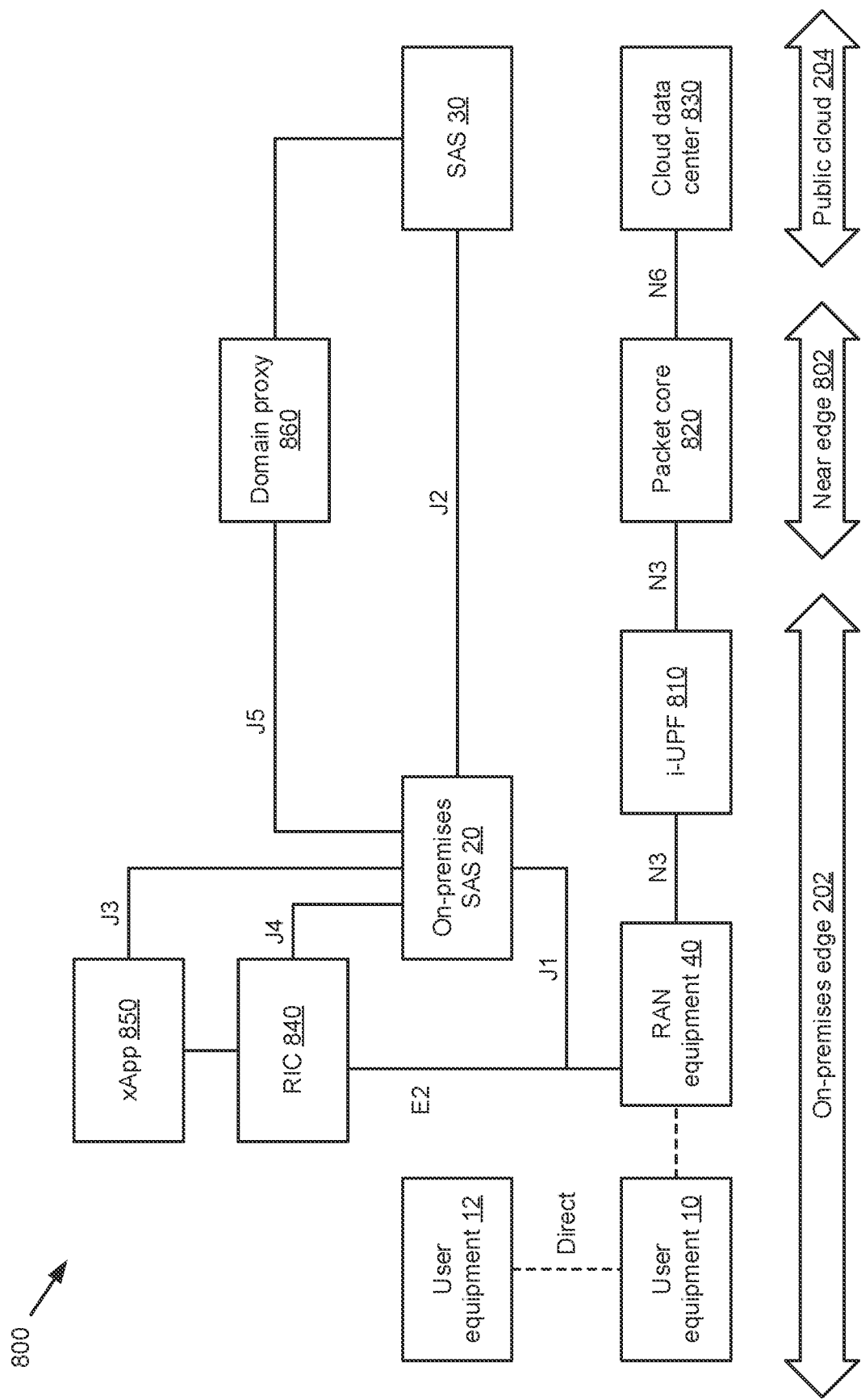
FIG. 8 is a block diagram of a system that facilitates application of access conditions to a spectrum grant in accordance with various implementations described herein.

Turning next to FIG. 8, a diagram 800 depicting an example network architecture in which various implementations described herein can function is provided. It is noted that the network architecture shown in diagram 800 is merely one example of a network architecture that can be utilized in connection with the implementations described herein, and that other network architectures could also be used. Additionally, it is noted that while various elements shown in diagram 800 relate to a 5G communication network, other radio access technologies could also be used in a similar manner to that shown by diagram 800.

As shown in diagram 800, a UE 10 can be enabled for communication over a RAN (e.g., a RAN operating in CBRS spectrum as described above, etc.) via a direct connection with RAN equipment 40, such as an eNB or gNB and/or other suitable equipment. The connection between the UE 10 and the RAN equipment 40 can be established via any suitable connection techniques, either presently known in the art or developed in the future.

As additionally shown in diagram 800, the UE 10 can be directly connected to another UE 12, e.g., to facilitate device-to-device communications as described above. By way of example, UEs 10, 12 can be devices located in the same area (e.g., a building such as a school or warehouse, etc.) such that they are capable of direct communication. Further, as described above, the UEs 10, 12 need not be connected to the same communication network, e.g., a communication network associated with the RAN equipment 40, provided that the UE 10 is capable of accessing the on-premises SAS 20 by some means.

As further shown in diagram 800, the RAN equipment 40 can facilitate user plane communication via a connection to an Intermediate User Plane Function (i-UPF) 810 over one or more suitable interfaces, such as an N3 interface. The i-UPF 810 as shown in diagram 800 is located at the on-premises edge 202 with the UE 10 and RAN equipment 40, and can communicate with a packet core 820 associated with a near edge 802 via the N3 interface and/or another suitable interface. In an implementation, the near edge 802 can operate as an intermediate network location between the on-premises edge 202 and the public cloud 204. For instance, the packet core 820 located on the near edge 802 can facilitate transmission and receipt of user plane data from one or more sources external to the near edge 802, such as a cloud data center 830 located on the public cloud 204, via an N6 interface and/or another suitable interface.

With regard to the control plane, the RAN equipment 40 shown in diagram 800 can establish a connection with the on-premises SAS 20 as described above via a direct, point-to-point (uninterrupted, continuous) interface between the RAN equipment 40 and the on-premises SAS 20, e.g., the J1 interface shown in diagram 800. Also or alternatively, the RAN equipment 40 can be connected to an Open RAN (O-RAN) RAN Intelligent Controller (RIC) 840, e.g., via an E2 interface. While not shown in diagram 800, the on-premises SAS 20 can be implemented wholly or in part via the RIC 840 and/or one or more application functions associated with the RIC 840, such as an xApp 850. In an implementation in which the on-premises SAS 20 is implemented separately from the RIC 840 and xApp 850, the on-premises SAS 20 can facilitate communication with the RIC 840 and xApp 850 via respective direct interfaces, e.g., J4 and J3 interfaces shown in diagram 800, respectively.

As further shown in diagram 800, the on-premises SAS 20 can facilitate direct communication with a SAS 30 associated with the public cloud 204 via a further direct interface between the on-premises SAS 20 and the SAS 30, e.g., the J2 interface shown in diagram 800. Also or alternatively, the on-premises SAS 20 can communicate with the SAS 30 indirectly through one or more intermediate entities, such as a domain proxy 860 located on the near edge 802, via a J5 interface and/or another suitable interface.

Figure 9:
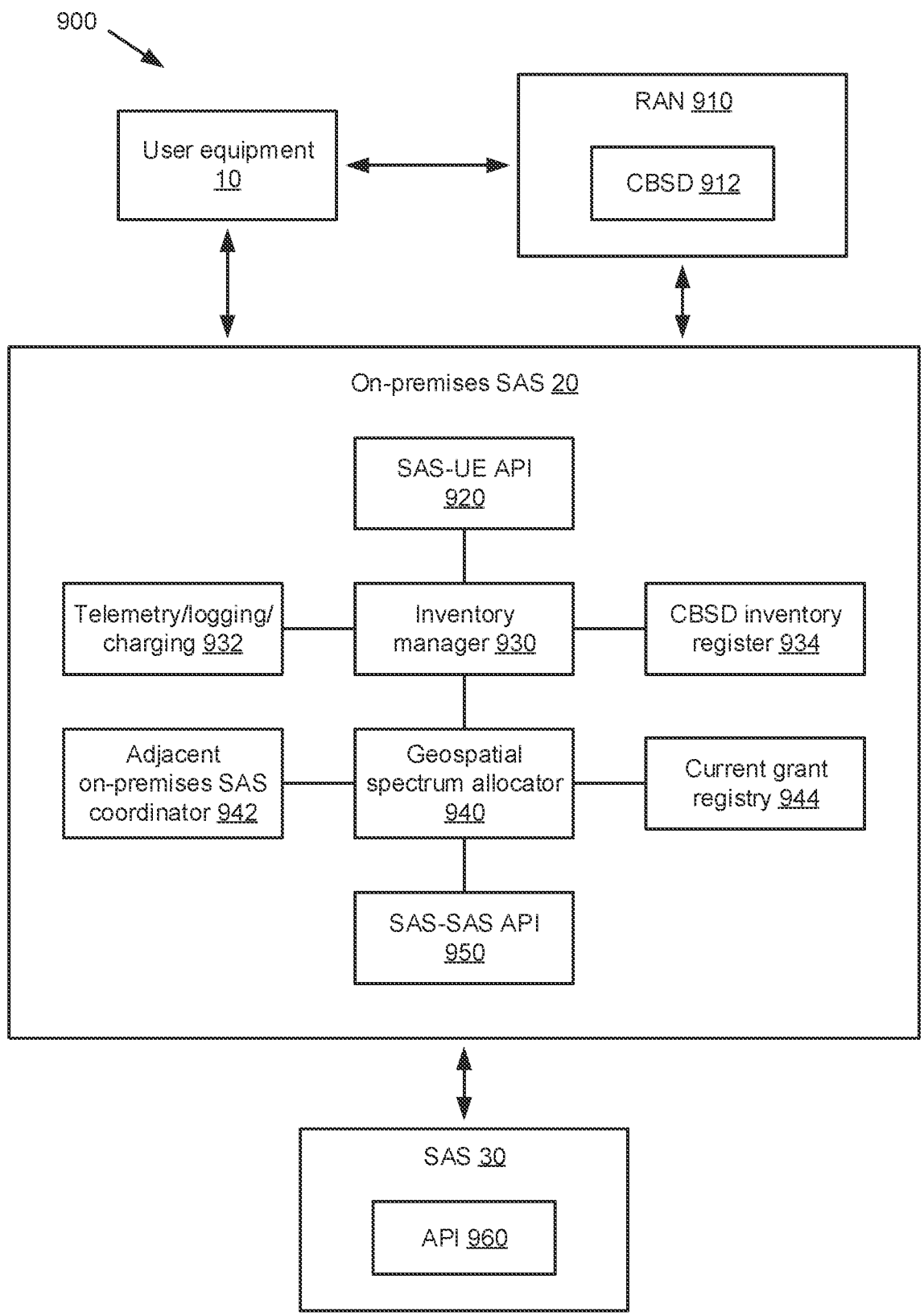
FIG. 9 is a diagram depicting an example architecture and respective interfaces that can be utilized by an on-premises spectrum access system in accordance with various implementations described herein.

Turning now to FIG. 9, a diagram 900 depicting an example architecture and respective interfaces that can be utilized by an on-premises SAS 20 is provided. As shown in diagram 900, the on-premises SAS 20 can communicate with a UE 10, either directly or indirectly via one or more devices associated with a RAN 910 such as a CBSD 912, via a SAS-UE application programming interface (API) 920.

The on-premises SAS 20 shown in diagram 900 further includes an inventory manager 930, which can maintain information relating to an inventory of spectrum resources available to the on-premises SAS 20, e.g., spectrum resources obtained via master grants from a SAS 30 as described above. The on-premises SAS 20 additionally includes a telemetry/logging/charging module 932, which can facilitate dynamic updates to the available spectrum inventory, e.g., based on telemetry information gathered from the UE 10 and/or other devices. As further shown in diagram 900, the inventory manager 930 can maintain information relating to respective devices, e.g., the UE 10 and/or CBSDs 912, to which the on-premises SAS 20 is connected via a CBSD inventory register 934 and/or other suitable data structure.

The on-premises SAS 20 in diagram 900 additionally includes a geospatial spectrum allocator 940, which serves as a central point of knowledge in the on-premises SAS 20 to handle incoming spectrum requests, e.g., spectrum requests from the UE 10. The geospatial spectrum allocator 940 can interact with an adjacent on-premises SAS coordinator 942, which can coordinate spectrum grants with other nearby on-premises SASs 20. For instance, since CBRS spectrum grants are localized to a given area, the adjacent on-premises SAS coordinator 942 can communicate with other nearby on-premises SASs 20 to facilitate swapping spectrum grants, to reduce interference between devices in neighboring areas, to bundle resources between adjacent on-premises SASs 20 to optimize localized spectrum grants, etc. As further shown by diagram 900, the geospatial spectrum allocator 940 can also be associated with a current grant registry 944, which can maintain information relating to the currently active secondary grants enabled by the on-premises SAS 20 and/or other nearby devices.

As diagram 900 further illustrates, the on-premises SAS 20 can utilize a SAS-SAS API 950 to communicate with a central SAS 30, e.g., for obtaining master grants as described above. In an implementation, the SAS-UE API 920 and the SAS-SAS API 950 can be distinct APIs that are configured to facilitate communication with their respective designated end points.

Figure 10:
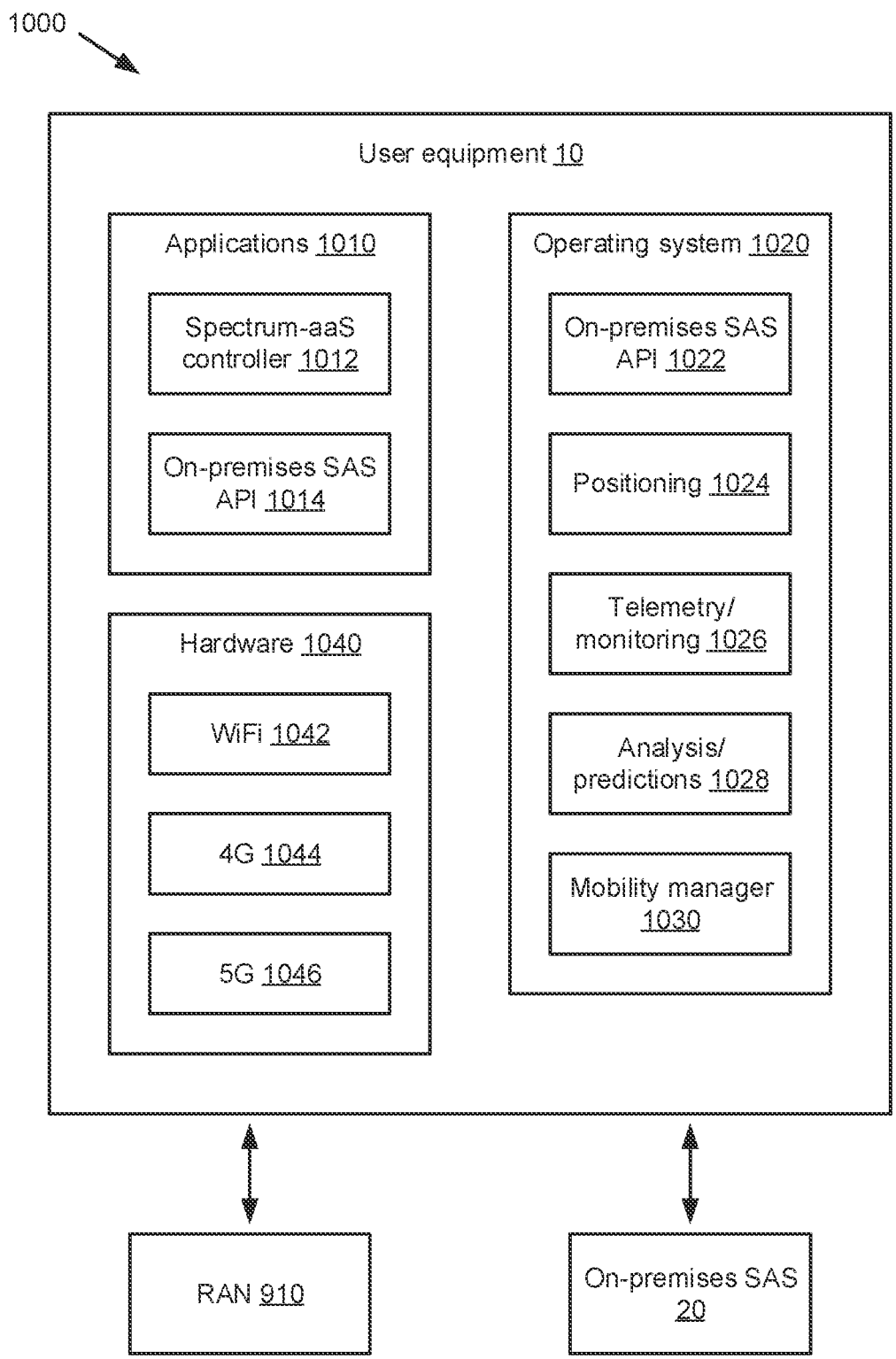
FIG. 10 is a diagram depicting an example architecture and respective interfaces that can be utilized by a user equipment in accordance with various implementations described herein.

Diagram 1000 in FIG. 10 depicts an example architecture and respective interfaces that can be utilized by a UE 10 configured for communication with an on-premises SAS 20 as shown in FIG. 9, either directly or indirectly via a RAN 910. As shown in FIG. 10, the UE 10 can be associated with one or more applications 1010 that can be executed on the UE 10. The applications 1010 can include, e.g., a spectrum-as-a-service (spectrum aaS) controller 1012, which can request and/or manage CBRS spectrum and/or other spectrum resources from an on-premises SAS 20, e.g., as described above. As further shown in FIG. 10, one or more applications 1010 running on the UE 10 can include, and/or otherwise be associated with, an on-premises SAS API 1014. Similar to the APIs 920, 950 of the on-premises SAS 20 shown in FIG. 9, the UE 10 can utilize the on-premises SAS API 1014 as a communication endpoint for transmission of access requests and/or other signaling to the on-premises SAS 20 as well as receipt of signaling from the on-premises SAS 20.

As further shown by FIG. 10, an operating system 1020 running on the UE 10 could also include and/or otherwise be associated with an on-premises SAS API 1024, which can function in a similar manner to the on-premises SAS API 1014 described above. While the UE 10 shown in FIG. 10 includes two on-premises SAS APIs 1014, 1024 for purposes of illustration, it is noted that the UE 10 could include just one of the on-premises SAS APIs 1014, 1024 in some implementations. As further shown in FIG. 10, the operating system 1020 of the UE 10 can also include modules that facilitate other functions. These modules can include, e.g., a positioning module 1022, a telemetry/monitoring module 1026, an analysis/predictions module 1028, and a mobility manager module 1030.

The UE 10 shown in FIG. 10 additionally includes respective hardware 1040 that can facilitate communication by the UE 10 via respectively corresponding RATs. This hardware can include Wi-Fi hardware 1042, 4G hardware 1044, 5G hardware 1046, and/or any other suitable hardware. Additionally, while the UE 10 is illustrated in FIG. 10 as having both 4G hardware 1044 and 5G hardware 1046, it is noted that the UE 10, in some implementations, could support communication over only one, or none, of the 4G and 5G RATs.

Figure 11:
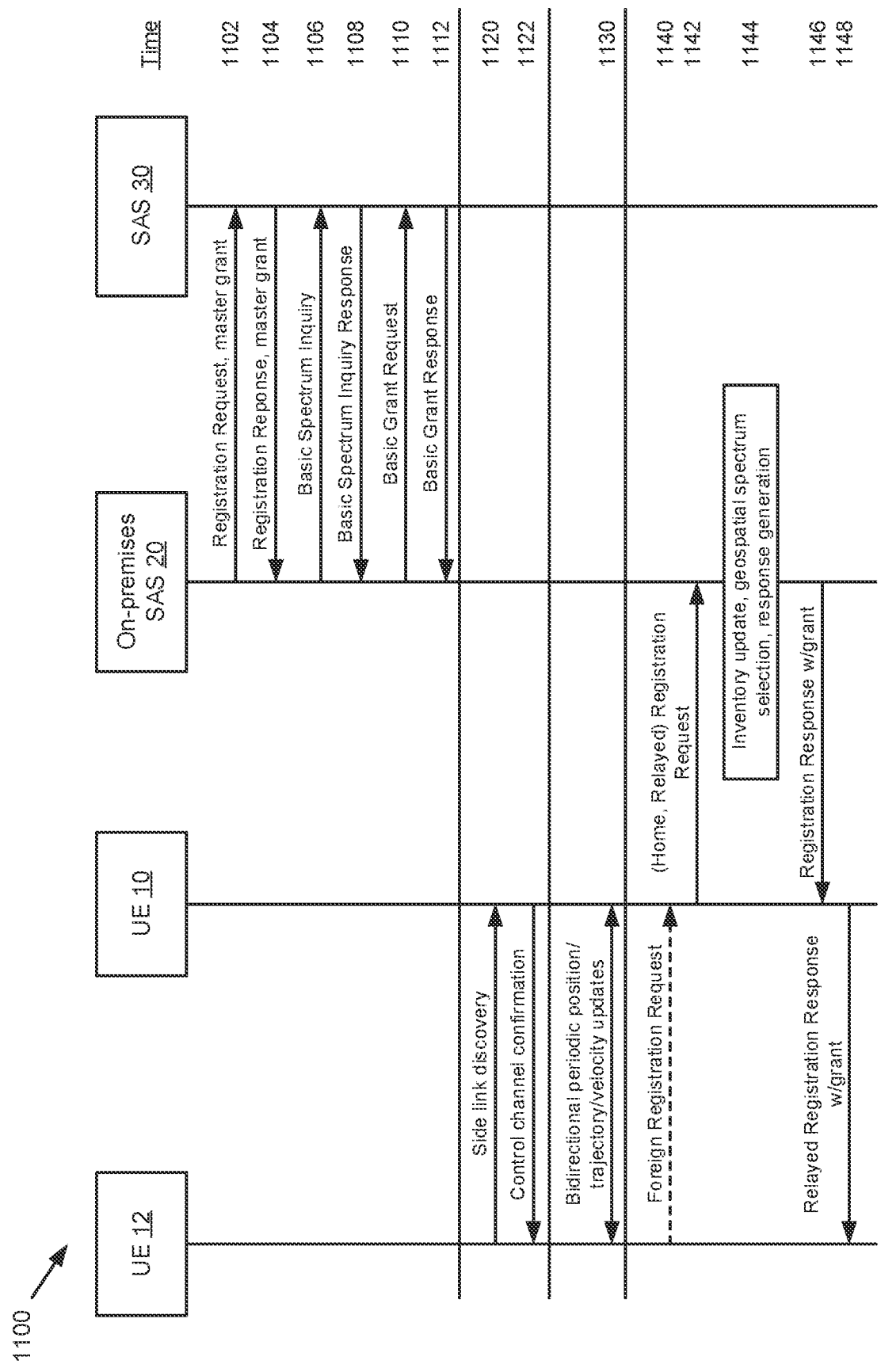
FIG. 11 is a messaging flow diagram depicting respective techniques for initiating spectrum requests from user equipment in accordance with various implementations described herein.

With reference now to FIG. 11, a messaging flow diagram 1100 that depicts respective techniques for handling spectrum requests from UEs 10, 12 are provided. More particularly, FIG. 11 depicts example messaging flows that can occur between UEs 10, 12, an on-premises SAS 20, and a SAS 30 in connection with a request for a secondary spectrum grant. It is noted that FIG. 11 merely represents examples of procedures that could be utilized by these network elements, and that other procedures could also be used. Additionally, while RAN equipment 40 is not shown in FIG. 11 for simplicity of illustration, it is noted that the communications between the UE 10 and the on-premises SAS 20 shown by FIG. 11 could pass through RAN equipment 40 before reaching their respective destinations. It is further noted that the UE 12 could be associated with the same communication network(s) as the UE 10, e.g., a communication network by which the UE 10 is connected to the on-premises SAS 20, or alternatively the UE 12 could be outside of said network(s).

The procedure shown by diagram 1100 begins with the on-premises SAS 20 initiating a request for a master grant, e.g., via a CBSD registration process including three bidirectional message exchanges shown at times 1102-1112. More particularly, at time 1102, the on-premises SAS 20 sends a CBSD Registration Request message to the SAS 30 for a given master grant. At time 1104, the SAS 30 sends a CBSD Registration Response message to the on-premises SAS 20.

Next, at time 1106, the on-premises SAS 20 sends a CBSD Basic Spectrum Inquiry message to the SAS 30. In response, the SAS 30 can check the availability of the spectrum requested by the on-premises SAS 20 for the master grant. Subsequently, at time 1108, the SAS 30 can send a CBSD Basic Spectrum Inquiry Response message to the on-premises SAS 20 that indicates the availability of the spectrum. If the requested spectrum is available, the on-premises SAS 20 can submit a CBSD Basic Grant Request to the SAS 30 at time 1110. At time 1112, the SAS 30 can finalize the master grant to the on-premises SAS 20 by sending a CBSD Basic Grant Response message to the on-premises SAS 20.

As a result of the messaging shown at times 1102-1112, the on-premises SAS 20 can be given a master grant for a given portion of spectrum resources. As further shown by diagram 1100, the UEs 10, 12 can establish an initial connection at times 1120 and 1122. More particularly, the UE 12 can initiate side link discovery with the UE 10 at time 1120, e.g., as described above with respect to FIG. 3. As a result of this side link discovery process, the UE 10 can establish an initial communication link with the UE 12 via a control channel confirmation transmitted from the UE 12 to the UE 10 at time 1122. While the operations shown at times 1120-1122 are placed below the operations shown at times 1102-1112, it is noted that the operations at times 1120-1122 could occur before, during, or after the operations shown at times 1102-1112.

Subsequent to a connection being established between the UEs 10, 12 as shown at times 1120-1122, the UEs 10, 12 can engage in periodic position, trajectory, and/or velocity updates, as shown at time 1130. Information obtained via these updates can be utilized by the UE 10 in submitting a spectrum request, e.g., as shown at times 1140-1148, and/or modifying an existing spectrum grant as needed, e.g., based on changes in device locations.

Based on a master grant provided to the on-premises SAS 20 at times 1102-1112, and an initial communication link established by the UEs 10, 12 at times 1120-1122, the UE 10 can submit a request for a secondary grant to the on-premises SAS 20 as shown at times 1140-1148. In the event that the request for the secondary grant is initiated by the UE 12, the UE 12 can provide a CBSD Registration Request message, and/or another suitable message, to the UE 10 at time 1140. As shown in diagram 1100, this message is referred to as a foreign registration request message. In response to receiving the foreign registration request at time 1140, the UE 10 can relay the registration request to the on-premises SAS 20 at time 1142. Alternatively, in the event that the request for the secondary grant is initiated by the UE 10, the UE 10 can transmit a CBSD Registration Request message and/or another suitable message, referred to in diagram 1100 as a home registration request, to the on-premises SAS 20 at time 1142.

At time 1144, the on-premises SAS 20 can determine the availability of the spectrum requested at time 1142 within its obtained master grants by performing actions such as an inventory update, geospatial spectrum selection, and/or other suitable actions. The on-premises SAS 20 could also perform additional actions at time 1144, including generating a response for transmission to the UE 10, temporarily blocking the spectrum to be granted to the UE 10, and performing optimizations to existing spectrum allocations as desired.

At time 1146, the on-premises SAS 20 can confirm the grant to the UE 10 by sending a CBSD Registration Response message, and/or another suitable message, to the UE 10. In contrast to the master grant procedure performed between the on-premises SAS 20 and the SAS 30 at times 1102-1112, the registration response sent by the on-premises SAS 20 at time 1146 completes the secondary grant process. At time 1148, the UE 10 can then relay the registration response received from the on-premises SAS 20 at time 1146 to the UE 12, e.g., in order to facilitate device-to-device communications over the granted spectrum as described herein.

Figure 12:
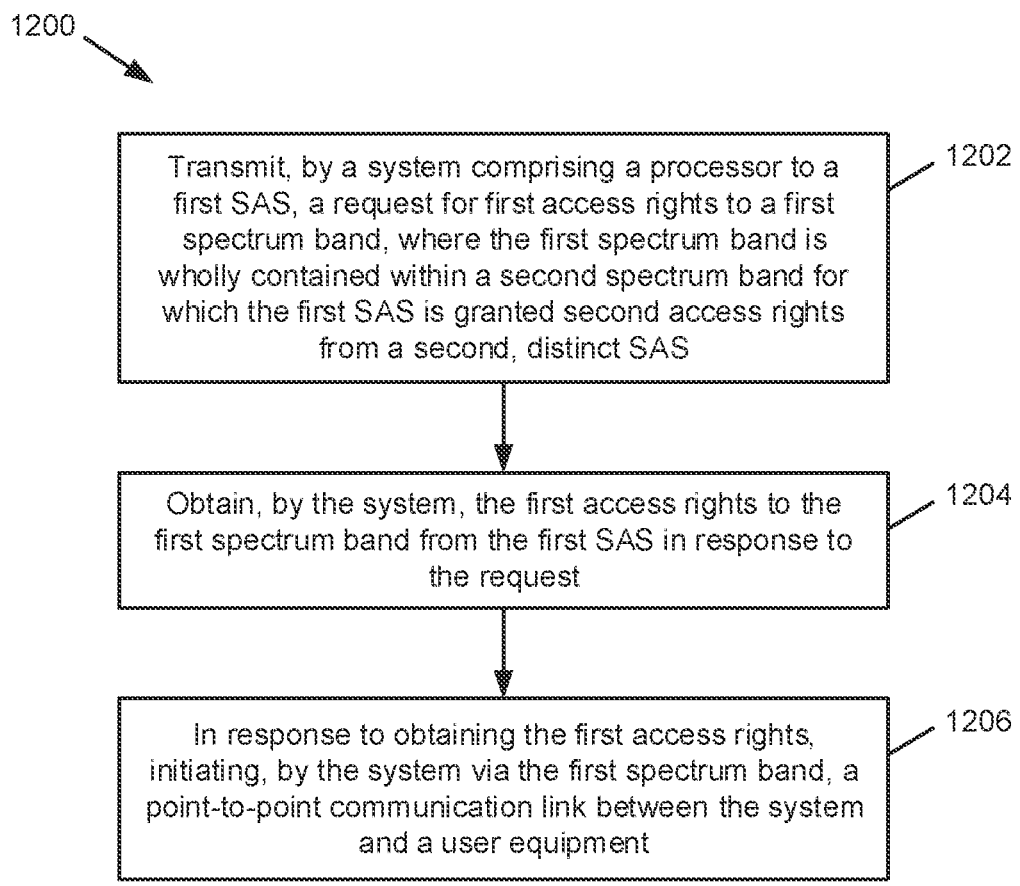
FIG. 12 is a flow diagram of a method that facilitates a client-initiated low-latency network edge spectrum-as-a-service controller in accordance with various implementations described herein.

Referring next to FIG. 12, a flow diagram of a method 1200 that facilitates a client initiated low-latency network edge spectrum-as-a-service controller is illustrated. At 1202, a system (e.g., a UE 10) operatively coupled to a processor can transmit (e.g., via a spectrum request component 110), to a first SAS (e.g., an on-premises SAS 20), a request for first access rights to a first spectrum band. Here, the first spectrum band is wholly contained within a second spectrum band for which the first SAS is granted second access rights from a second, distinct SAS (e.g., a SAS 30).

At 1204, the system can obtain (e.g., by a grant processing component 120) the first access rights to the first spectrum band in response to the request transmitted at 1202.

At 1206, in response to obtaining the first access rights at 1204, the system can initiate (e.g., by a link establishment component 130) a point-to-point communication link between the system and a UE (e.g., a UE 12).

FIGS. 5 and 12 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 13:
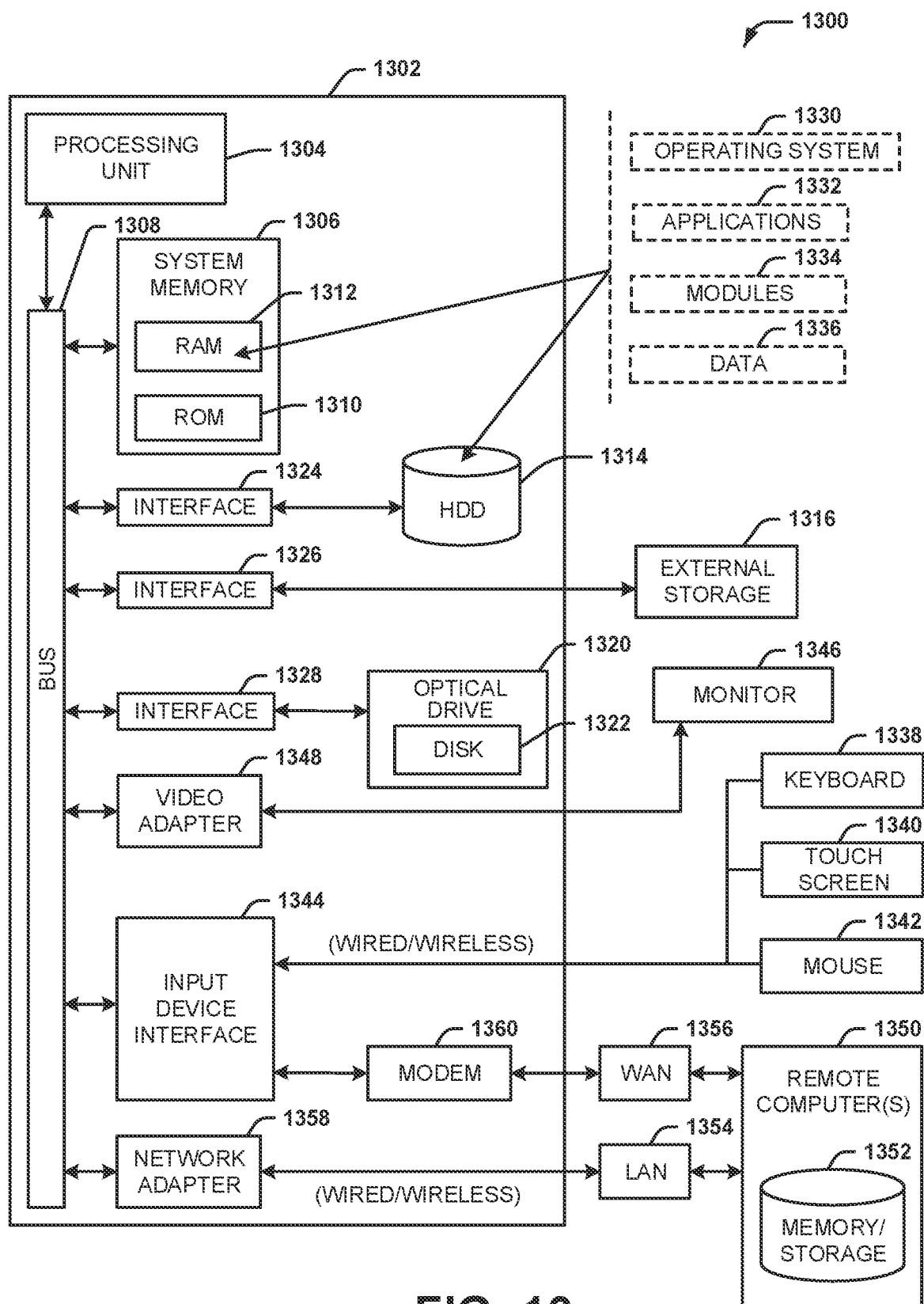
FIG. 13 is a diagram of an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD), a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one memory that stores instructions; and
   at least one processor that executes the instructions stored in the at least one memory, wherein the instructions cause the at least one processor to:
      transmit, via a communication network, a registration request message to a first spectrum access system, the registration request comprising an access request for a first spectrum band, wherein the first spectrum band is wholly contained within a second spectrum band, and wherein the first spectrum access system is granted an access license for the second spectrum band from a second spectrum access system that is distinct from the first spectrum access system;
      receive a registration response message, comprising a grant of access rights to the first spectrum band, from the first spectrum access system in response to the registration request message, wherein the first spectrum access system issues the grant of the access rights to the first spectrum band without exchanging any messages with the second spectrum access system; and
      in response to receiving the grant of the access rights to the first spectrum band, establish, via the first spectrum band, a device-to-device communication link between a first user equipment at which the system operates and a second user equipment, wherein the device-to-device communication link does not traverse any radio access network elements of the communication network between the first user equipment and the second user equipment.

2. The system of claim 1, wherein the device-to-device communication link is a second device-to-device communication link, and wherein the instructions further cause the at least one processor to:
   establish a first device-to-device communication link between the first user equipment and the second user equipment, wherein transmission of the access request for the first spectrum band is in response to the first device-to-device communication link being established.

3. The system of claim 2, wherein the first device-to-device communication link is associated with a first radio access technology, and wherein the second device-to-device communication link is associated with a second radio access technology that is distinct from the first radio access technology.

4. The system of claim 1, wherein the instructions further cause the at least one processor to:
   receive the access request for the first spectrum band from the second user equipment, wherein transmission of the access request to the first spectrum access system is in response to the access request being received.

5. The system of claim 1, wherein:
   the registration request message is transmitted to the first spectrum access system without transmitting any other messages to the first spectrum access system, and
   the registration response message is received from the first spectrum access system without receiving any other messages from the first spectrum access system.

6. The system of claim 5, wherein the registration request message comprises an indication of the first spectrum band within the second spectrum band, and wherein reception of the grant of the access rights is in response to the first spectrum access system determining that the first spectrum band is available for use based on an inventory of spectrum resources associated with the second spectrum band as maintained by the first spectrum access system.

7. The system of claim 1, wherein transmission of the access request for the first spectrum band to the first spectrum access system is via an application programming interface associated with an application executing on the second user equipment.

8. The system of claim 1, wherein transmission of the access request for the first spectrum band to the first spectrum access system is via an application programming interface associated with an operating system of the second user equipment.

9. The system of claim 1, wherein the instructions further cause the at least one processor to:
terminate the device-to-device communication link between the system and the user equipment by transmitting, to the first spectrum access system, a spectrum release message for the first spectrum band.

10. The system of claim 1, wherein:
the registration request message is a Citizens Broadband Radio Service (CBRS) Registration Request message that comprises the access request for the first spectrum band,
the registration response message is a CBRS Registration Response message that comprises the grant of the access rights, and
the device-to-device communication link is established without exchanging any other messages, other than the CBRS Registration Request message and the CBRS Registration Response message, with the first spectrum access system.

11. A method, comprising:
transmitting, by a system comprising at least one processor to a first spectrum access system via a radio access network, a registration request message comprising a request for first access rights to a first spectrum band, wherein the first spectrum band is wholly contained within a second spectrum band for which the first spectrum access system is granted second access rights from a second spectrum access system, distinct from the first spectrum access system;
obtaining, by the system, a registration response message, comprising a grant of the first access rights to the first spectrum band, from the first spectrum access system in response to the registration request message, the first access rights to the first spectrum band being granted by the first spectrum access system without exchanging any messages with the second spectrum access system; and
in response to obtaining the first access rights, initiating, by the system via the first spectrum band, a point-to-point communication link between a first user equipment at which the system operates and a second user equipment, wherein the device-to-device communication link does not traverse any network elements of the radio access network between the first user equipment and the second user equipment.

12. The method of claim 11, wherein the point-to-point communication link is a second point-to-point communication link, and wherein the method further comprises:
establishing, by the system, a first point-to-point communication link between the first user equipment and the second user equipment, wherein the transmitting of the request for the first access rights comprises transmitting the request for the first access rights in response to the first point-to-point communication link being established.

13. The method of claim 12, wherein the first point-to-point communication link is associated with a first radio access technology, and wherein the second point-to-point communication link is associated with a second radio access technology that is distinct from the first radio access technology.

14. The method of claim 11, further comprising:
receiving, by the system, the request for the first access rights from the second user equipment, wherein the transmitting of the request for the first access rights comprises relaying the request for the first access rights to the first spectrum access system in response to the receiving.

15. The method of claim 11, wherein the registration request message is transmitted to the first spectrum access system without transmitting any other messages to the first spectrum access system, and wherein the registration response message is received from the first spectrum access system without receiving any other messages from the first spectrum access system.

16. A non-transitory machine-readable medium comprising computer executable instructions that, when executed by at least one processor of first user equipment, facilitate performance of operations, the operations comprising:
transmitting, to a first spectrum access system via a communication network, a registration request message comprising an allocation request for a first spectrum band, wherein the first spectrum band is wholly contained within a second spectrum band, and wherein the first spectrum access system is granted access rights to the second spectrum band by a second spectrum access system that is distinct from the first spectrum access system;
receiving, from the first spectrum access system, a registration response message, comprising an allocation of the first spectrum band, in response to the registration request message, the allocation of the first spectrum band being issued by the first spectrum access system without exchanging any messages with the second spectrum access system; and
in response to receiving the allocation of the first spectrum band, establishing a direct communication link to a second user equipment via the first spectrum band, wherein the direct communication link does not traverse any radio access network elements of the communication network between the first user equipment and the second user equipment.

17. The non-transitory machine-readable medium of claim 16, wherein the direct communication link is a second direct communication link, and wherein the operations further comprise:
establishing a first direct communication link to the second user equipment, wherein the transmitting of the allocation request for the first spectrum band comprises transmitting the allocation request for the first spectrum band in response to the first direct communication link being established.

18. The non-transitory machine-readable medium of claim 17, wherein the first direct communication link is associated with a first radio access technology, and wherein the second direct communication link is associated with a second radio access technology that is distinct from the first radio access technology.

19. The non-transitory machine-readable medium of claim 16, wherein the operations further comprise:
   receiving the allocation request for the first spectrum band from the second user equipment, wherein the transmitting of the allocation request for the first spectrum band comprises relaying the allocation request for the first spectrum band from the second user equipment to the first spectrum access system.

20. The non-transitory machine-readable medium of claim 16, wherein the registration request message is transmitted to the first spectrum access system without transmitting any other messages to the first spectrum access system, and wherein the registration response message is received from the first spectrum access system without receiving any other messages from the first spectrum access system.

* * * * *